Jan. 13, 1953 A. G. HERRESHOFF ET AL 2,625,388
ADJUSTABLE SUSPENSION FOR VEHICLES
Filed Oct. 18, 1947
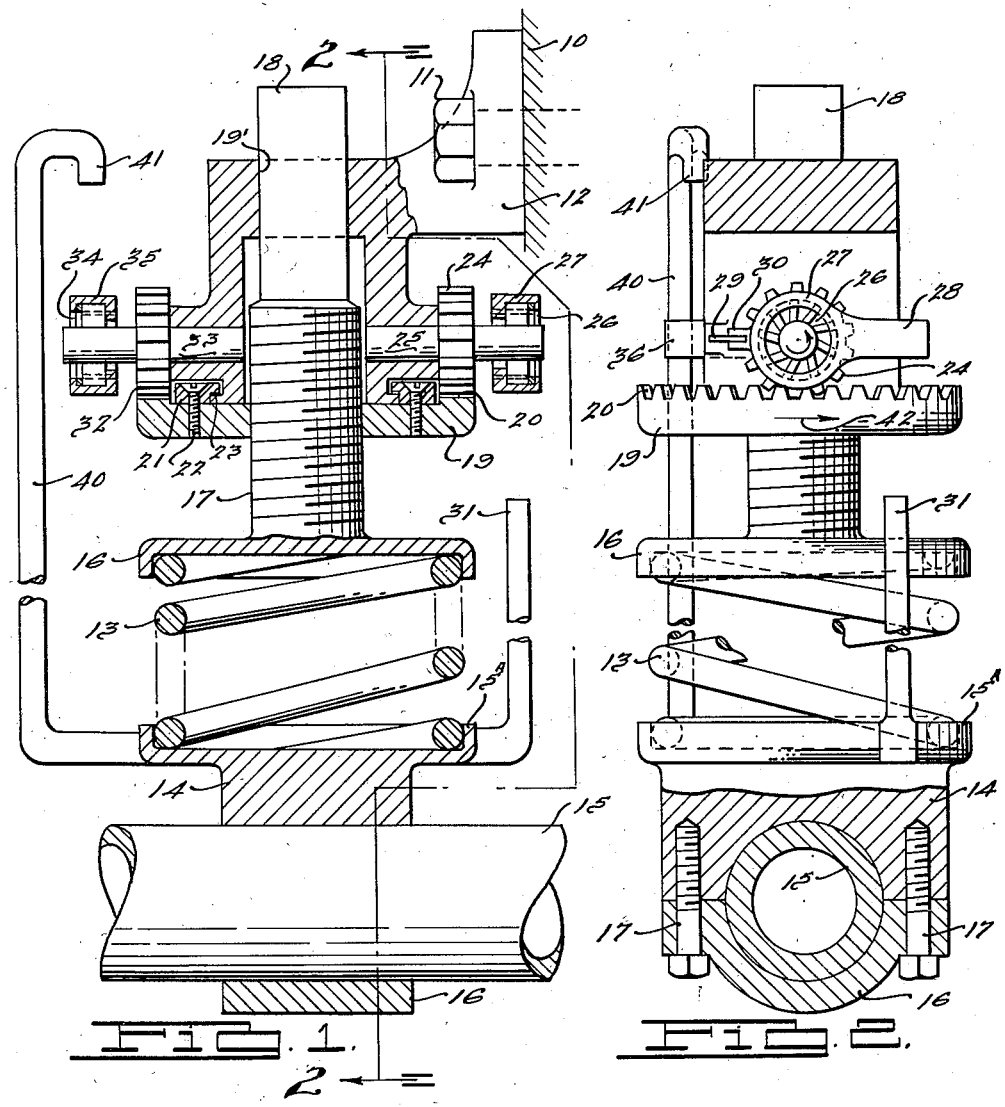
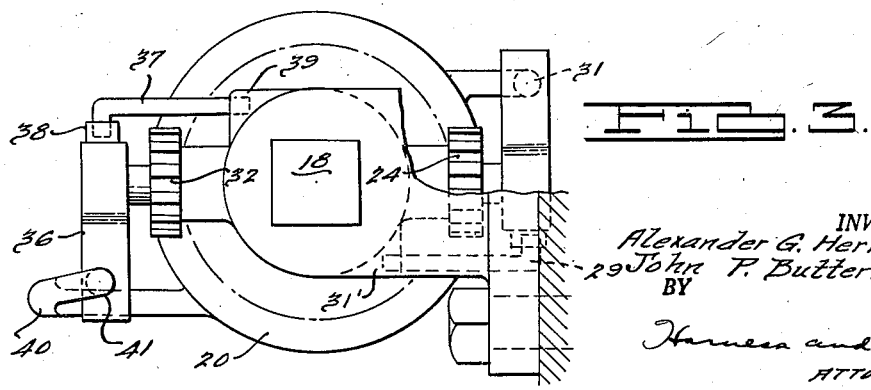
INVENTORS.
Alexander G. Herreshoff,
John P. Butterfield.
BY
Harness and Harris
ATTORNEYS.

Patented Jan. 13, 1953

2,625,388

UNITED STATES PATENT OFFICE 2,625,388

ADJUSTABLE SUSPENSION FOR VEHICLES

Alexander G. Herreshoff, Grosse Pointe, and John P. Butterfield, Highland Park, Mich., assignors to Chrysler Corporation, Highland Park, Mich., a corporation of Delaware Application October 18, 1947, Serial No. 780,622

8 Claims. (Cl. 267—60)

This invention relates to a vehicle suspension. More specifically, it relates to a suspension for any vehicle in which the weight of passengers or objects being carried is relatively high in comparison to the weight of the body.

An object of the present invention is to provide improvements in an adjustable suspension for any vehicle.

Another object is to improve a suspension that has the requisite softness at various loads and yet provides a reduction in the total deflection that results from heavy loading of a soft suspension.

Other objects will appear from the disclosure.

In the drawings:

Fig. 1 is a longitudinal section through the novel suspension of the present invention;

Fig. 2 is a view taken along the line 2—2 of Fig. 1; and

Fig. 3 is a plan view of the suspension of Fig. 1.

Reference character 10 designates a vehicle body member to which is attached by one or more screws 11 a member 12, hereinafter called a supported or a support member, because it is carried by a coil spring 13 resting on a member 14, hereinafter called a supporting member. Supporting member 14 is secured to an axle member 15 by means of a cap 16 and screws 17. The supporting member 14 carries a flanged head 15ª in which rests the lower end of the coil spring 13. Upon the upper end of the coil spring 13 rests a flanged head 16 of a threaded member 17. The threaded member 17 has a non-circular portion 18 engaging a correspondingly shaped non-circular opening 19' in the support member 12, which prevents the threaded member 17 from having rotation with respect to the supported member 12, but permits the threaded member to have axial movement with respect to the supported member. The threaded member 17 engages a threaded member 19, having integrally formed therewith a crown gear 20. A flanged ring 21 formed in two sections is secured by screws 22 to the threaded member 19 and engages a groove 23 in the supported member 12 in such a manner as to prevent the threaded member 19 from having axial movement with respect to the supported member 12, but to permit relative rotation between these members.

The crown gear 20 on the threaded member 19 is engaged, to one side of the threaded member 17, by a gear wheel 24 secured to a shaft 25 rotatably mounted in the supported member 12. A one-way clutch or ratchet 26 associates the outer end of the shaft 25 with a hub portion 27 of an arm 28. The arm 28 is yieldingly held in the position shown in Fig. 2 by a flat spring 29 (Fig. 3) having one end inserted in portion 30 of the arm and the other end inserted in a boss 31' formed on the supported member 12. The arm 28 is positioned so as to be engaged by a vertical rod 31 attached to the flanged head 15ª of the supporting member 14 when the coil spring 13 is sufficiently compressed under heavy load upon the body 10 and the supported member 12 to bring the arm 28 down to the upper end of the rod 31.

On the opposite side of the threaded member 17, the crown gear 20 is engaged by a gear wheel 32 fixed to a shaft 33 rotatably mounted in the supported part 12. A one-way clutch or ratchet 34 associates the outer end of the shaft 33 with a hub portion 35 of an arm 36. A flat spring 37, having one end inserted in a portion 38 of the arm 36 and the other end inserted in a portion 39 formed on the supported part 12, maintains the arm 36 in horizontal position, as indicated by the portion of the arm 36 projecting from the left side of Fig. 2. A rod 40 secured to the flanged head 15 of the supporting part 14 has a reversely bent upper end 41 positioned over the arm 36 so as to be adapted to engage the same when the supported part 12 moves above the position shown in Figs. 1 and 2 under a very light loading upon the coil spring 13.

The operation of the above suspension will now be described. Suppose that the vehicle body 10 is heavily loaded to the point where the upper end of the rod 31 comes into immediate adjacency with the arm 28. When now relative reciprocal movement between the supported part 12 and the supporting part 14 takes place because of bounce or jounce, the rod 31 will move upward into engagement with the arm 28 causing it to have counterclockwise angular movement, as seen in Fig. 2. This counterclockwise movement is transmitted through the one-way clutch 26 to the gear 24, which rotates in the direction of arrow 42 in Fig. 2. Thereby the threaded member 19 moves axially upward along the threaded member 17, causing the spacing of the supported member 12 from the head 16 of the threaded member 17 and from the upper end of the coil spring to increase. Thereby the spacing of the supported member 12 and the supporting member 14 is increased. When in the course of relative reciprocation between the supporting and supported members, the rod 31 moves downward from the arm 28, the arm will be returned to the horizontal position shown in Fig. 2 by the flat spring 29. This involves clockwise rotation of the arm 28 as viewed in Fig. 2, but rotation in this direction is not transmitted through the one-way clutch 26 to the shaft 25 and the gear 24. When, during the course of relative reciprocation between the supported and supporting parts, the rod 31 again moves, upward angularly shifting the arm 28 counterclockwise, the gear 24 is again rotated counterclockwise, causing rotation of the threaded member 19 in the direction of the arrow 42 in Fig. 2, and the threaded member 19 will move further up the threaded member 17. Thus the spacing of the supporting and supported parts is increased. This process continues so long as the vehicle body 10 is heavily loaded as aforesaid until upward movement of the threaded member 19 on the threaded member 17 is sufficient to take the arm 28 beyond the limit of the path of movement of the rod 31.

Let us assume now that the heavy load on the vehicle is removed, and only a light load remains. Now the spring 13 expands, and because of this expansion and the previous upward movement of the threaded member 19 on the threaded member 17, the arm 36, and the bent end 41 on the rod 40 are brought into immediate adjacency. Now when relative reciprocation between the supporting and supported parts takes place because of bounce or jounce, the rod end 41 moves the end of the arm 36 downward, causing the one-way clutch 34 to rotate the shaft 33 and the gear 32 in such a direction as to make the threaded member 19 move downward on the threaded member 17. Thereby the spacing between the threaded member 19 and the flanged head 16 and the upper end of the coil spring 13 is decreased, and correspondingly the spacing between the supported and supporting parts 12 and 14 is decreased. When, during the aforementioned reciprocation, the rod end 41 moves upward, the left end of the arm 36 also moves upward under the action of the flat spring 36. Upward movement of the arm 36 to the horizontal position is not communicated to the shaft 33 and the gear 32 through the one-way clutch 34 and, therefore, there are no rotation of the threaded member 19 and no axial movement of the threaded member 19 along the threaded member 17. Repeated downward movement of the rod end 41 against the arm 36 again causes the one-way clutch 34 to transmit such movement of the arm 36 as angular movement of the gear 32 and the shaft wheel 33. This results in a repeated rotational movement of the threaded member 19 and downward movement of the threaded member 19 with respect to the threaded member 17. This decreases the spacing between the supported part 12 and supporting part 14.

When the vehicle body 10 is again heavily loaded, the upper end of the rod 31 comes into contact with the arm 28 and causes, during relative reciprocation of the supporting and supported parts, the previously described oscillation of the arm 28 resulting in upward movement of the threaded member 19 along the threaded member 17 and an increase in the spacing of the supporting and supported parts. Since the threaded member 19 has previously been adjusted downward along the threaded member 17 by repeated engagement of the rod end 41 with the arm 36, the engagement of the rod 31 with the arm 28 takes place at a heavy loading lighter than the first described heavy loading.

The above described suspension is used to advantage in any vehicle in which the ratio of body load plus passenger load to body load may be relatively high. In such a vehicle the springs must be relatively soft in order to assure the proper ride at light load. Yet when the springs are soft the deflection of the heavy load may be too great. The above described suspension provides compensation for this by increasing the spacing between the supported and supporting parts during heavy load.

We claim:

1. An adjustable resilient suspension comprising a lower supporting part, an upper supported part, a coil spring between said parts, a seat receiving one end of the coil spring and having projections thereon, a contractably adjustable extension device connected to the opposite end of the coil spring and cooperating with the spring seat so as to include the coil spring therebetween in a manner such that the latter acts between the parts so as initially to cause the parts to have a comparatively small relative spacing due to a heavy load on the supported part and a comparatively large relative spacing due to a light load on the supported part, a mechanical drive train drivingly connected to said device for adjusting the degree of extension thereof having limit means operatively associated with one said projection for appropriate response to reciprocal movement of the parts with respect to one another at the small spacing for extending the device to increase the spacing between the parts, and further limit means operatively associated with another said projection for appropriate response to reciprocal movement of the parts with respect to one another at approximately the large spacing for effecting a contraction of the device to decrease the spacing between the parts.

2. In combination, supporting and supported parts, a spring having its lower end associated with the supporting part, a first threaded member mounted on the upper end of the spring and associated with the supported part so as to be axially shiftable but non-rotatable with respect to the supported part, a second threaded member associated with the supported part so as to be rotatable but held against axial shift with respect thereto, said second threaded member being threadably engaged with the first threaded member for driving the latter and having gear teeth; a first gear engaging the gear teeth and journalled relative to the supported part; a first part connected for movement with the first gear; a second part connected for movement with the supporting part; said first and second parts being engageable with one another upon relative reciprocal movement between said supported and supporting parts at comparatively close spacing between the latter for rotating the first gear in one direction only in order to rotate the second threaded member in a given direction only for axially shifting the first threaded member relative to the second threaded member to increase the spacing between said supported and supporting parts, a second gear engaging the gear teeth on the second threaded member and journalled relative to the supported part, a third part connected for movement with the second gear; a fourth part connected for movement with the supporting part; said third and fourth parts being engageable with one another upon relative reciprocal movement between said supported and supporting parts at comparatively wide spacing between the latter for rotating the second gear in one direction only in order to rotate the second threaded member only in the direction opposite to the aforesaid given direction for axially shifting the first threaded member relative to the second threaded member to decrease the spacing between said supported and supporting parts.

3. The combination specified in claim 2 wherein the first part is drivingly connected to the first gear by means including a one-way clutch and wherein the third part is drivingly connected to the second gear by means including a one-way clutch.

4. In combination, a bracket, a nut rotatable in said bracket, a traveling screw threadably received in said nut and having an end restrained against rotation relative to the bracket, a pair of rock shafts journalled with respect to said bracket, each shaft being provided with a crank arm and a one-way clutch coupling the arm thereto, means drivingly connecting the shafts to the nut for causing the screw to telescope into and out of the bracket upon movement of the crank arms, support means resiliently supporting the bracket axially at the other end of the screw and at a level varying with the axial stress therealong and including projecting structures defining opposed first and second abutments lying laterally of the crank arms, said first abutment being operatively aligned with one of the crank arms for imparting torque thereto incident to movement of the bracket axially of the resilient support means, and said second abutment being similarly operatively aligned with the other of the crank arms.

5. In combination a bracket, a nut provided with gear teeth and rotatable in said bracket, a traveling screw threadably received in said nut and having an end restrained against rotation relative to the bracket, a pair of rock shafts journalled with respect to said bracket, each shaft being provided with a crank arm and a one-way clutch coupling the arm thereto, sets of teeth mounted on said shafts and enmeshed with said gear teeth to rotate the nut in a certain direction when a certain of the crank arms is actuated and in a counter direction when the other of the crank arms is actuated, support means resiliently supporting the bracket axially at the other end of the screw and at a level varying with the axial stress therealong, said support means being provided with a first stop for one crank arm and a second stop for the other of the crank arms, said first and second stops as incident to motion of the bracket axially of the resilient support means being adapted to engage and impart a moving torque to the respective one or the other of the crank arms for subjecting the nut to appropriate rotation.

6. In combination, supported and supporting parts, a compression spring having its lower end associated with the supporting part, a pair of threaded members connected to the upper end of the spring and to the supported part, the threaded members of said pair engaging one another so as to respond to relative rotation by adjusting the supported part with respect to the upper end of the spring, a first crank arm driver geared to a threaded member of said pair and engageable with means on the supporting part upon relative reciprocation of the supported and supporting parts with respect to one another at relatively small spacing therebetween due to heavy load on the supported part for rotating the threaded members in one direction relative to one another, and a second crank arm driver geared to a threaded member of said pair and engageable with means on the supporting part upon relative reciprocation of the supporting and supported parts with respect to one another at relatively great spacing therebetween due to light load on the supported part for rotating the threaded members in the opposite direction relative to one another.

7. An adjustable resilient suspension comprising first and second parts one to support the other, a compression spring having one end thereof associated with the first part, an elongated member received by the second part and having respective non-circular and threaded end portions projecting in opposite directions from the second part, said threaded end portion engaging the other end of the compression spring, said second part having an opening of complemental non-circular configuration slidably receiving the non-circular end portion of the elongated member and holding the latter against relative rotation thereto, a threaded rotatable member rotatably carried by the second part and being in threaded engagement with the threaded end portion of the elongated member, and a plurality of crank arms independently rotatably connected to the rotatable member for driving it in mutually different directions of rotation, each of said crank arms being engageable with means on the first part effective to crank the arm upon predetermined reciprocal movement between the first and second parts aforesaid and by force of the movement to cause the rotatable member in turn to rotate and the second part to slide non-rotatably along the elongated member.

8. An adjustable resilient suspension comprising first and second parts one to support the other, a compression spring having one end thereof associated with the first part, an elongated member received by the second part and having respective non-circular and threaded end portions projecting in opposite directions from the second part, said threaded end portion engaging the other end of the compression spring, said second part having an opening of complemental non-circular configuration slidably receiving the non-circular end portion of the elongated member and holding the latter against relative rotation thereto, a threaded rotatable member rotatably carried by the second part and being in threaded engagement with the threaded end portion of the elongated member, a plurality of crank arms independently rotatably connected to the rotatable member for driving it in mutually different directions of rotation, each of said crank arms being engageable with means on the first part effective to crank the arm from a neutral position upon predetermined reciprocal movement between the first and second parts aforesaid and by force of the movement to cause the rotatable member in turn to rotate and the second part to slide non-rotatably along the elongated member, and resilient elements mounted to the second part for restoring the crank arms to their respective neutral positions.

ALEXANDER G. HERRESHOFF.
JOHN P. BUTTERFIELD.

REFERENCES CITED

The following references are of record in the file of this patent:

UNITED STATES PATENTS

| Number | Name | Date |
| --- | --- | --- |
| 1,937,854 | Stratton | Dec. 5, 1933 |
| 2,379,012 | Lee | June 26, 1945 |